REEL WITH HOLDING GROOVE

Filed Aug. 31, 1965

INVENTOR.
PAUL A. MIETTUNEN
BY Eugene M. Eckelman
ATTORNEY 3,284,016
Patented Nov. 8, 1966

3,284,016

REEL WITH HOLDING GROOVE

Paul A. Miettunen, 3833 S. Calaroga Circle,
Lake Oswego, Oreg.

Filed Aug. 31, 1965, Ser. No. 483,936
9 Claims. (Cl. 242—74)

This application comprises a continuation-in-part of application Serial No. 338,958 filed January 20, 1964 for Reels for the Storage of Magnetic Recording Tape, now abandoned, and relates to improvements in reel structures of the type wherein a temporary grip is obtained on an end portion of a tape by frictionally engaging side edges thereof.

It is customary in the storage and use of magnetic-type recording tapes to wind the tapes on reels. After each use, the tape must be rewound to make it available for the next use. Tape holding reels have heretofore been provided which obtain a temporary grip on a tape by frictionally engaging side edges thereof. Such reels, however, have not achieved commercial success because of their complex construction and also because they do not maintain certain critical dimensional limits for positively gripping the tape.

It is therefore a primary objective of the present invention to provide a film reel which utilizes a holding groove for engaging the side edges of a strip of tape, and more particularly to provide such a reel which is inexpensive to manufacture and which at the same time has a rugged construction facilitating an efficient gripping of a tape.

A more particular object is to provide a reel of the type described having an integrated molded structure of a hub, side flanges, and side edge tape gripping means associated with the hub, the reel having no moving parts or appurtenances which may be sprung out of adjustment or otherwise made less efficient with repeated usage in the side edge gripping of the tape.

Additional objects will become apparent from the following specification and claims, considered together with the accompanying drawings, wherein the numerals of reference indicate like parts.

Figures 1, 2, 3, 4, 5, 6, 7, 8, 9, 10:
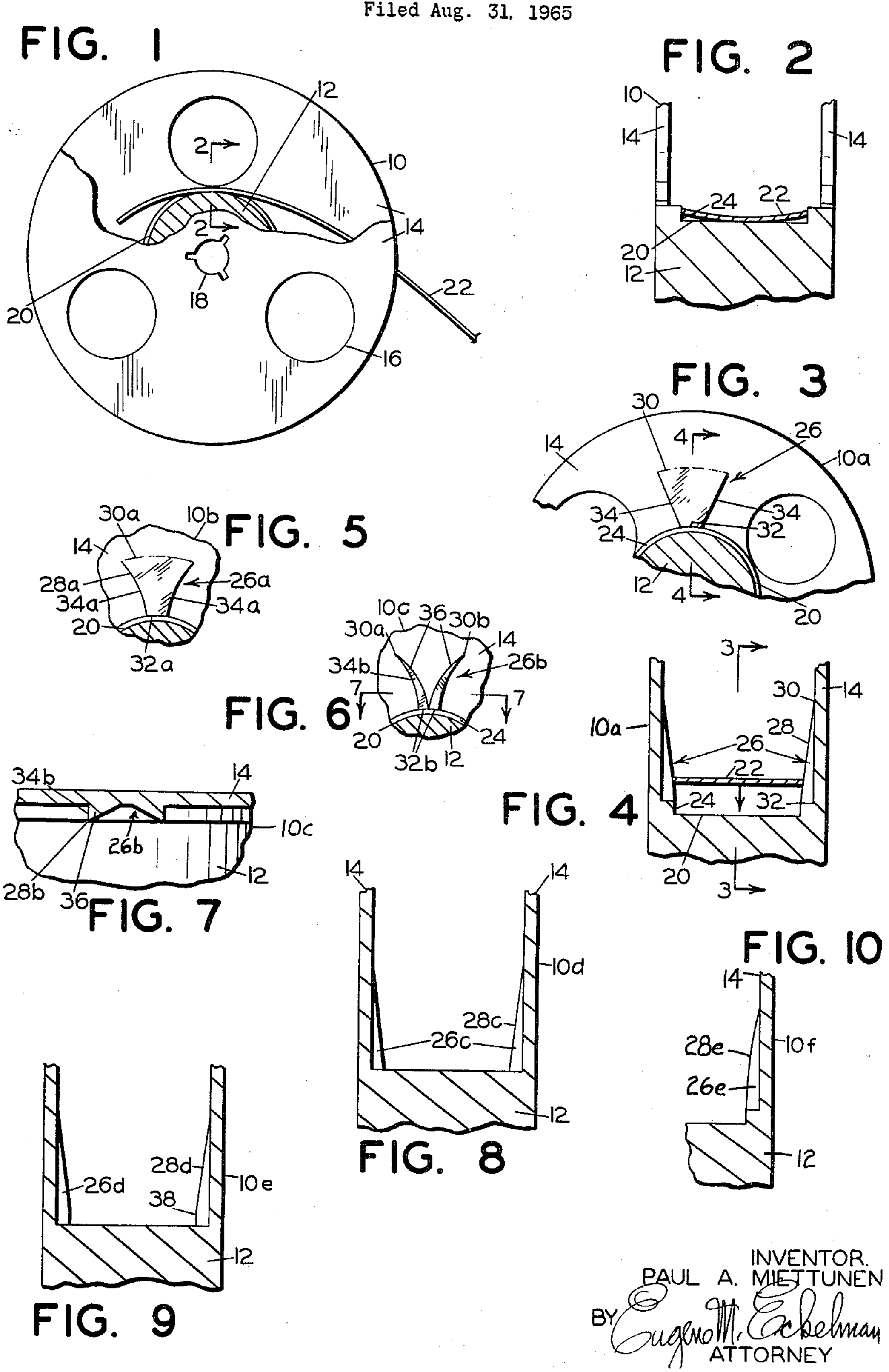
FIGURE 1 is a side elevational view of a reel embodying the principles of the present invention, a portion thereof being broken away to better show internal construction.
FIGURE 2 is a fragmentary sectional view taken on the line 2—2 of FIGURE 1.
FIGURE 3 is a fragmentary sectional view of a modification wherein guide means are employed for guiding tape into a holding groove in the reel, said view being taken on the line 3—3 of FIGURE 4.
FIGURE 4 is a fragmentary sectional view taken on the line 4—4 of FIGURE 3.
FIGURES 5 and 6 are fragmentary sectional views taken on a line similar to FIGURE 3 but showing further forms of tape guide means.
FIGURE 7 is a sectional view taken on the line 7—7 of FIGURE 6.
FIGURES 8, 9 and 10 are sectional views taken on a line similar to FIGURE 4 and showing still further forms of tape guide means.

Referring now in particular to the drawings and first to FIGURES 1 and 2, there is shown a reel 10 having a hub 12 and circular parallel side flanges 14 on the hub. The side flanges 14 have the usual apertures 16, and the reel is provided with a central notched bore 18 for driven engagement with a drive spindle.

Hub 12 is provided with a peripheral groove 20 which as apparent in FIGURE 2 is of less width than the distance between the inner faces of the flanges 14. The lateral dimensions of the reel are such that tape is adapted freely to be wound on the hub but the groove 20 has a width slightly less than the width of a tape 22 whereby the side walls 24 of the groove are arranged to frictionally engage the tape for obtaining a temporary grip on an end portion thereof. In the structure of FIGURES 1 and 2, the side walls 24 of the groove are normal to the bottom of the groove.

FIGURE 2 illustrates the position of the tape as it would appear when initially placed in the groove and engaged at its side edges by the side walls 24 of the groove. Since the tape is wider than the groove it will curve slightly in its lateral dimension when forced into the groove, thus causing pressure on the side walls of the groove sufficiently to be frictionally gripped therebetween. The side walls of the groove may be slightly textured or otherwise roughened to accomplish a more positive grip on the tape than would a smooth surface. To thread a tape on the reel, an end portion thereof is laid in the groove and wrapped partially around the hub or else the reel is rotated sufficiently to obtain a grip on the tape. Less than a quarter wrap around the reel is sufficient to provide the desired grip. Groove 20 need only be of a depth to hold a few wraps of the tape but of course a depth sufficient to receive one wrap would be sufficient in most cases to grip the tape.

As stated before, the groove 20 is of slightly less width than the tape, and the relative width of said groove and the tape must necessarily be within critical dimensions. For example, it has been found that to obtain an efficient edge gripping the width of the groove 20 must be in the range of from .006 to .011 inch less than the width of the tape. As a further example, an ideal width of groove for the usual one quarter inch tape is .241 inch. It has further been found that in order to provide a reel structure of maximum stability wherein the width of the groove is maintained within the critical limits, as well as to provide an inexpensive reel suitable for mass commercial production, it preferably is molded as an integral structure wherein the flanges 14 are molded integral with the hub 12 and the groove 20 comprises a molded depression in the hub.

FIGURES 3 and 4 illustrate a modified form of reel 10*a* wherein radially disposed guide means 26 are provided on the inner faces of the flanges 14 for guiding the tape 22 into the groove 20 in the initial gripping insertion. As best seen in FIGURE 4, the guide means 26 are wedge-shaped, having angled faces 28 leading from an outer thin end 30 to a hub end 32, the hub end of faces 28 being flush with the outer edges of the side walls 24 of groove 22 for smoothly transferring the tape into said groove from the guide means. As best apparent in FIGURE 3, the side edges 34 of the guide means 26 are convergent inwardly toward the hub. In threading an end of a tape 22 into the groove 20 of the reel 10*a*, the guide means 26 insure a rapid and efficient engagement of said tape with the side walls of the groove.

In a preferred construction, the inwardly directed edges of the side walls 34 are squared rather than rounded whereby to have a good frictional engagement with the side edge of a tape as the latter is being initially threaded on the reel, and since the side edges 34 are tapered or angled inwardly toward the hub the tape will automatically be urged inwardly toward the hub. As the tape is moved linearly across the guide means, either by longitudinal movement of the tape or by rotation of the reel, it is apparent that one of the edges 34 will frictionally engage the tape to cause the latter to move into the groove 20 whereas the other edge 34 will have no appreciable engagement with the tape.

It is desirable that the pairs of the guide means 26 be in opposed relation on opposite sides of the groove 20 and that at least three pairs of these guide means be provided on the reel. Guide means 26 preferably are molded as an integral part of the reel in order that the entire reel will in general comprise a single part unit, or if desired guide means 26 may be secured, as by gluing, in place to accomplish the same purpose.

FIGURE 5 illustrates a reel **10*b* having a modified form of guide means 26*a*. The reel 10*b* otherwise is similar in structure to the reel 10 of FIGURE 1. The guide means 26*a* similarly have angled faces 28*a* leading from an outer thin end 30*a* to a thickened hub end 32*a*, the said hub end being flush with the side wall of the groove 20. Side edges 34*a* of the guide means 26*a* are convergent inwardly toward their hub end as in the FIGURE 3 embodiment but in addition are concaved in configuration. The concaved configuration of these side edges serves most efficiently to frictionally engage the side edges of the tape for urging the tape radially inwardly toward the groove 20**.

FIGURES 6 and 7 show a further form of guide means **26*b*, on a reel 10*c*. Such guide means comprise a pair of wing portions 36 flared arcuately outwardly from the hub. These wing portions have outer thin ends 30*b* and thickened hub ends 32*b* similar to the guide means 26 and 26*a* of FIGURES 3 and 5, respectively. The facing edges 28*b* at the hub ends 32*b* thereof are flush with the side walls 24 of the groove 20. The arcuate side edges 34*b* of the wing portions 36 efficiently engage the side edges of a tape 22** for urging the tape radially inwardly toward the groove.

FIGURES 8, 9 and 10 show further modified forms of reel structures **10*d*, 10*e* and 10*f*, respectively. In the structure of FIGURE 8, there are employed guide means 26*c* in association with a reel hub 12 which does not have a peripheral groove. The guide means in this embodiment otherwise assume the shape of the guide means in FIGURE 3. The lateral spacing between the faces 28*c* of opposed guides 26*c*** at their hub end is slightly less than the width of the tape and the side edge engagement thereof with said tape for gripping the latter is provided by the guide means themselves rather than by the walls of a groove.

In the reel construction **10*e* of FIGURE 9 there are employed guide means 26*d* which have angled face surfaces 28*d* as well as wall portions 38 leading at right angles into the surface of hub 12 and also leading into the surface 28*d*. The guide means 26*d* may assume the shape of the guide means in FIGURE 3. In this structure the distance between the opposed wall portions 38** is slightly less than the width of the tape whereby to obtain the desired edge gripping on the tape.

In FIGURE 10 there are shown guide means **26*e* also having angled face surfaces 28*e*. In this embodiment, the guide means may generally assume the general shape of the guide means in FIGURE 3 but the face surfaces 28*e* thereof are convexed as shown. It is to be understood, however, that the surfaces 28*e*** may be concaved rather than convexed as shown.

In accordance with the present invention it is important that all embodiments comprise a one-piece or integrated structure such as an integrated molded structure in order to provide an inexpensive construction as well as to provide and maintain the necessary tolerances mentioned in those laterally spaced surfaces or edges which engage the tape. Although the present description refers to reel structures for holding magnetic-type recording tapes, such reel structures may be used as well with other strip-type material such as film.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A reel for the storage of magnetic recording tape comprising a hub and a pair of side flanges molded integrally with said hub and disposed substantially in parallel relation for confining tape wound on said hub, said flanges having inwardly and outwardly facing surfaces, said hub having a peripheral surface on which tape may be wound, and laterally spaced wall means having tape engaging portions extending radially outwardly from the peripheral surface of said hub and arranged to receive a tape therebetween, the lateral spacing between said tape engaging portions being slightly less than the width of a tape for frictionally engaging the side edges of the tape to obtain a temporary grip thereon, said wall means extending radially only a short distance greater than the thickness of a tape and having an integral molded connection with said hub whereby to receive the lateral stability of said hub in maintaining the lateral spacing of said tape engaging portions.

2. The reel construction of claim 1 wherein said reel has a peripheral groove and said tape engaging portions comprise the laterally disposed defining walls of said groove.

3. The reel construction of claim 1 wherein said reel has a peripheral groove and said tape engaging portions comprise the laterally disposed defining walls of said groove, and including at least one pair of opposed, laterally facing guide means leading radially outwardly from said tape engaging portions to guide a tape into said groove.

4. The reel construction of claim 1 including at least one pair of opposed, laterally facing guide means leading radially outwardly from said wall means.

5. The reel construction of claim 4 wherein said guide means are wedge-shaped having thickened end portions at said wall means and being angled outwardly to thinned ends substantially flush with the inwardly facing surfaces of said flanges.

6. The reel construction of claim 4 wherein said guide means are wedge-shaped having thickened end portions at said wall means and being angled radially outwardly to thinned ends substantially flush with the inwardly facing surfaces of said flanges, each of said guide means having a pair of side edges in convergent relation toward said hub to provide angular tape engaging edges.

7. The reel construction of claim 4 wherein said guide means are wedge-shaped having thickened end portions at said wall means and being angled radially outwardly to thinned ends substantially flush with the inwardly facing surfaces of said flanges, each of said guide means having a pair of side edges in convergent relation toward said hub to provide angular tape engaging edges, said side edges being arcuate in configuration.

8. A reel for the storage of magnetic recording tape comprising a hub and a pair of parallel side flanges on said hub for confining tape wound on said hub, said flanges having inwardly and outwardly facing surfaces, said hub having a peripheral surface on which tape may be wound, and laterally spaced guide means having tape engaging portions extending radially outwardly from the peripheral surface of said hub and arranged to receive a tape therebetween, the lateral spacing between a part of said tape engaging portions being slightly less than the width of a tape for frictionally engaging the side edges of the tape to obtain a temporary grip thereon, said guide means being wedge-shaped having thickened end portions at said hub and being angled outwardly to thinned ends substantially flush with the inwardly facing surfaces of said flanges, each of said guide means having a pair of side edges in convergent relation toward said hub to provide angular tape engaging edges.

9. A reel for the storage of magnetic recording tape comprising a hub and a pair of parallel side flanges on said hub for confining tape wound on said hub, said flanges having inwardly and outwardly facing surfaces, said hub having an outer surface on which tape may be wound, said outer surface having a peripheral groove and laterally spaced guide means having tape engaging portions extending radially outwardly from the peripheral surface of said hub and arranged to receive a tape therebetween, the lateral spacing between a part of said tape engaging portions being slightly less than the width of a tape for frictionally engaging the side edges of the tape to obtain a temporary grip thereon, said guide means comprising wedge-shaped extensions leading radially outwardly and having thickened end portions at said hub adjacent said groove and being angled radially outwardly to thinned ends substantially flush with the inwardly facing surfaces of said flanges.

References Cited by the Examiner

UNITED STATES PATENTS

| | | | |
|---|---|---|---|
| 1,861,891 | 6/1932 | Wittel | 242—74.2 |
| 2,015,860 | 10/1935 | May | 242—74 |
| 2,226,825 | 12/1940 | McCauley | 242—74 |
| 2,973,159 | 2/1961 | Kulka | 242—71.8 |

FRANK J. COHEN, *Primary Examiner.*

MERVIN STEIN, *Examiner.*

N. L. MINTZ, *Assistant Examiner.*